May 27, 1969 V. R. SAARI 3,447,146

QUATERNARY ENCODING USING MULTIPLE FEEDBACK LOOPS AROUND OPERATIONAL AMPLIFIERS

Filed Dec. 29, 1965

INVENTOR
V. R. SAARI
BY Leonard A. Arnold
ATTORNEY

United States Patent Office 3,447,146
Patented May 27, 1969

3,447,146
QUATERNARY ENCODING USING MULTIPLE FEEDBACK LOOPS AROUND OPERATIONAL AMPLIFIERS

Veikko R. Saari, Chatham, N.J., assignor to Bell Telephone Laboratories, Incorporated, New York, N.Y., a corporation of New York Filed Dec. 29, 1965, Ser. No. 517,339
Int. Cl. H04l 3/00; H03k 13/00
U.S. Cl. 340—347 3 Claims This invention relates to a quaternary encoding stage which can perform the same operations as two binary stages in a stage-by-stage encoder. It uses precision resistors and switching diodes in four feedback paths around a high gain operational amplifier and derives from an input current an output current that traces a continuous range of valves four times in response to one full traversal of the input current range. Since each quaternary stage costs approximately half as much as the two binary stages it replaces, a substantial cost saving is realized.

United States Patent 2,632,058 which issued to F. Gray on Mar. 17, 1953, describes a coding technique that offers certain distinct advantages over the conventional binary code. These advantages follow from the particular characteristic of the Gray code, that no two successive numbers differ by more than a single digit. The Gray code is also called the reflected-binary code, due to the manner in which the code is formed.

One technique for forming reflected-binary code groups from analog signals is particularly advantageous and has been embodied in the "stage-by-stage" encoder. United States Patent 3,035,258, which issued to N. E. Chasek on May 15, 1962, describes such an encoder having many tandem encoding stages (one for each digit in the code word). Each of these stages has an analog input, analog output, and digit output. The analog output of the first stage is the analog input of the next, and so on. The stages exhibit a V-shaped transfer characteristic between the analog input and analog output. Conventional full wave bridge rectifiers in each stage yield this transfer characteristic and digit output means responsive to the conductivity state of one of the rectifier diodes determines the polarity of the input signal to each stage.

Improved stage-by-stage encoding circuitry is described in United States Patent 3,187,325 which issued to F. D. Waldhauer on June 1, 1965. As contemplated therein the desired V-shaped, or full-wave rectifier transfer characteristic is developed on a piecewise basis, that is, the two legs of the V are generated separately by an encoding network and subsequently combined. Each half of the desired characteristic is generated by means of an amplifier that has a feedback path comprising the serially connected combination of a nonlinear impedance element and a resistor. A piecewise-linear analog output is obtained from the junction of the nonlinear element and the resistor, and the binary, or digit output, is obtained from the output of the amplifier. Each amplifier has a pair of dissimilar feedback paths, each of which develops one-half the required transfer characteristic so that the resulting stage functions as a binary stage of a stage-by-stage encoder.

The most expensive part of each such binary encoding stage is the operational amplifier, which uses several active devices, and elaborate biasing and feedback-shaping networks. The cost of a stage-by-stage encoder can be substantially reduced by using fewer operational amplifiers.

It is, accordingly, an object of this invention to reduce the number of operational amplifiers required in a stage-by-stage encoder.

The invention will be more fully comprehended from the following detailed description taken in conjunction with the drawings in which.

Figure 1:
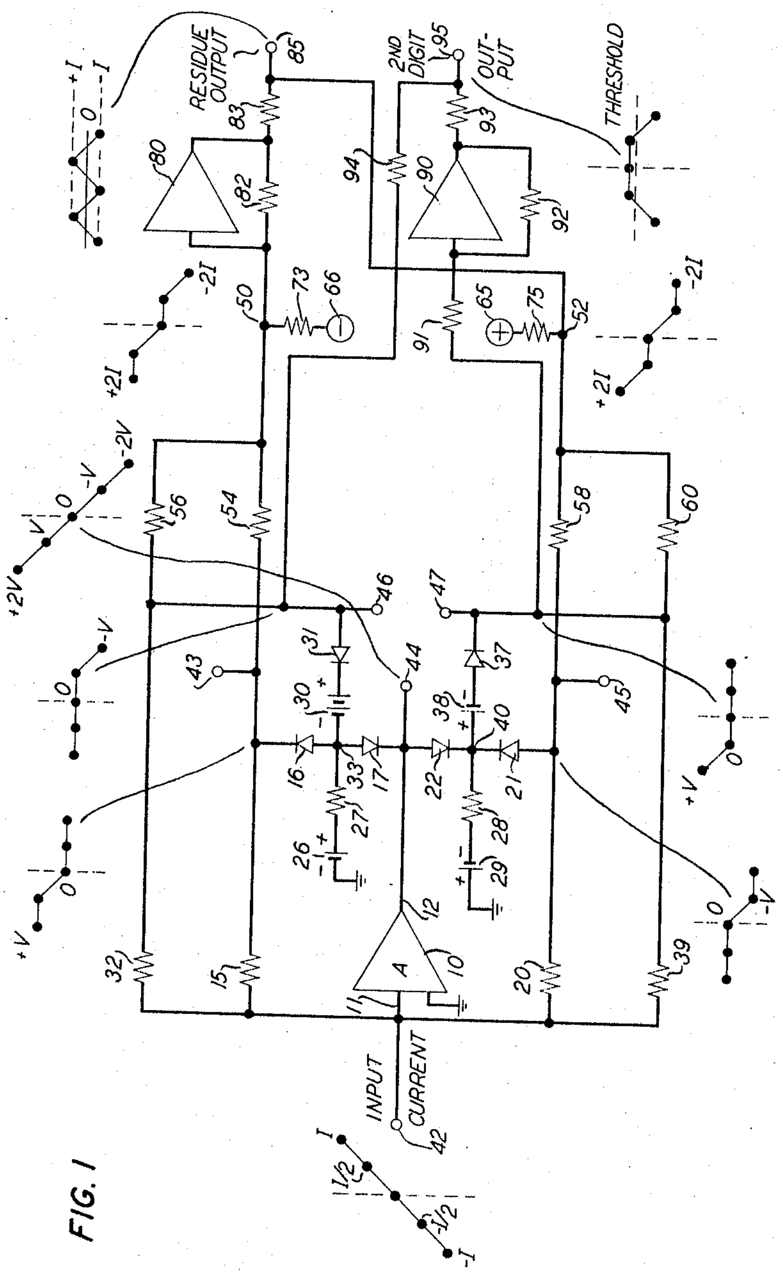
FIG. 1 is a diagram partially in block form of a quaternary encoding stage embodying the invention.

The present invention provides improved circuit means for realizing the stage-by-stage encoding process described in detail in each of the above-mentioned patents, but requires only half the number of operational amplifiers required by the Waldhauer patent. The quatenary encoding network is shown in FIG. 1 and is used in accordance with this invention with other similar networks in a manner to be described below to form the encoder. The nonlinear encoding network comprises an amplifier 10 having an input 11 and an output 12, and having four feedback networks. A first feedback network comprises a resistor 15, and two diodes 16 and 17 connected in a series circuit between the output 12 and the input 11 of the amplifier. Diodes 16 is poled in the direction of positive current flow from output 12 to input 11 and diodes 17 poled in the opposite direction. A similar feedback circuit comprising a resistor 20 and diodes 21 and 22 is also provided between the output 12 and the input 11. Diode 21 is poled to conduct positive current from input 11 to output 12 while diodes 22 is poled in the opposite direction. As shown in the drawing, the cathode of diode 17 and the anode of diode 22 are connected to the output terminal 12. A first current biasing network comprising the series connected battery 26 and resistor 27 is provided between the anode of diode 17 and ground. A second such biasing circuit comprising resistor 28 and battery 29 is connected between the cathode of diode 21 and ground.

Two additional feedback networks are provided. The first is the series connection of a battery 30, a diode 31, and a resistor 32 between the junction 33 of diodes 16 and 17 and input terminal 11. Diode 31 is poled in the direction of positive current flow from input terminal 11 to terminal 33 and battery 30 poled to back bias diode 31. The other feedback network comprises the series connection of diode 37, a battery 38, and a resistor 39 between the junction 40 of diodes 21 and 22 and input terminal 11. Diode 37 is poled to conduct positive current from junction 40 to input terminal 11 and battery 38 is poled to back bias diode 37. Briefly stated, in accordance with this invention, the four feedback networks are designed to cause the output current of the operational amplifier to shift between four possible paths thereby producing four residue output currents which may be combined to produce a double V-shaped transfer characteristic as well as the equivalent of a single V-shaped transfer characteristic. Thus the quatenary stage performs the functions of two of the binary stages described in the Waldhauer patent.

The circuit has a network input terminal 42 which is directly connected to the input 11 of amplifier 12, and has seven output terminals. The first of these output terminals, terminal 43, is directly connected to the junction of resistor 15 and diode 16. The second output terminal 44 is at the output 12 of amplifier 10, the third output terminal 45 is at the junction of resistor 20 and diode 21. The fourth and fifth of these output terminals 46 and 47 are connected to the anode of diode 31 and the cathode of diode 37, respectively. The sixth and seventh output terminals 50 and 52 are summing points. They are at a virtual zero voltage with respect to ground and are connected to sources of negative and positive voltage 65 and 66, respectively, by resistors 73 and 75, respectively. The output signal current at output terminal 50 is the sum of the output signal currents at terminals 43 and 46 obtained by means of their connection to terminal 50 by resistors 54 and 56, respectively. Similarly, resistors 58 and 60 sum the signals at terminals 45 and 47 at output terminal 52.

The input 11 of operational amplifier 10 is at substantially ground potential. This results from the fact that amplifier 10 has both a high current gain and a high voltage gain and that substantial negative feedback is applied. Accordingly, when the voltage at the amplifier output 12 is finite, all but a negligible part of the input current flows into the feedback network rather than into amplifier 10. The fact that the amplifier input 11 is substantially at ground potential and that the amplifier 10 produces one phase reversal should be borne in mind while considering the description to follow.

When the input signal at terminal 42 is at zero current, the output 12 of the amplifier is at zero voltage and diodes 17 and 22 conduct strongly so that current from biasing sources 26 and 29 flows through these diodes. When the input signal goes slightly positive, i.e., when a current is injected into the input 11 of the amplifier 10, the signal at the output terminal 12 becomes negative. Since diode 22 is conducting strongly and therefore presents a relatively low impedance there is a nearly constant voltage across it, and the voltage at junction 40 therefore becomes negative. Diode 21 then begins to conduct because the voltage at its cathode electrode, which closely follows the output of the amplifier, is negative with respect to its anode.

As a result, incremental current flows through resistors 20 and 58 connected to the anode of diode 21 and the incremental voltage at the anode of diode 21 drops in a linear relationship with the input. This drop in voltage continues until the sum of the current supplied through resistors 58 from the feedback networks of the driven amplifiers connected to terminal 52, and the current supplied through resistor 20 from the input 42 is substantially equal to the bias current supplied by battery 29. Substantially all the current from battery 29 is then drained off through diode 21, and little or no current flows through diode 22 which is now a high impedance. The anode of diode 21 is then effectively clamped to a voltage —V, as illustrated, and this occurs when the input current is at (or above) an input current value $+I/2$.

When the input current is $+I/2$ units or greater the voltage at the amplifier output 12 then is sufficiently negative to substantially forward-bias diode 31. Diode 31 then begins to conduct and the voltage at its anode, or at output terminal 46, drops in a linear relationship with the input. As the input signal increases, the voltage at output terminal 46 continues to drop because the amplifier output continues to decline at terminal 44; as illustrated. The voltage derived from the anode of diode 21 at terminal 45 remains clamped to —V volts.

For input signals of increasingly negative current, the operation of the corresponding symmetrical circuitry is similar. Diode 16 first begins conducting and the voltage at its cathode, or output terminal 43, rises towards +V volts. This rise in voltage is due to the current flowing through resistors 15, 54 and 94. This action continues until the current flowing through resistors 15 and 54 and 94 is equal to the bias current supplied by source 26 at which time diode 17 becomes a high impedance and the voltage at the cathode of diode 16 is clamped to +V volts in the same manner, as above described, that the anode of diode 21 was clamped to —V volts. This occurs when the input current is at $-I/2$ units.

When the input current is more negative than $-I/2$ units, the voltage at the output 12 of the operational amplifier is sufficiently positive to substantially forward-bias diode 37, and as a result the voltage at its cathode, or output terminal 47, rises toward +V volts. The voltage is limited to +V because in the preferred application the input stops increasing or else reverses its direction of change when that point has been reached.

For convenience the output voltages and currents generated by the circuit are shown (as functions of the input current) at the various output terminals in FIG. 1. To simplify an understanding of these wave forms, a dashed vertical line has been drawn through the input current wave form at zero units of current and four dots are used to denote four values of the input current. The two positive values $$+\frac{I}{2}$$

and +I are indicated by two equally spaced dots to the right of the vertical line and two equally spaced dots to the left of the vertical line indicate the two negative values $$-\frac{I}{2}$$

and —I. A vertical line is also shown passing through each of the output signal wave forms. This line is to be understood to indicate the value of the output voltage or current, as indicated, when the input current is at zero units. The first dot to the right of the vertical line in an output voltage wave forms is the voltage or current when the input current is at $$+\frac{I}{2}\text{ units}$$

of current and the voltage or current at the second dot to the right is the voltage when the input signal is at +I units. Similarly, the first and second dots to the left of the vertical line in an output voltage wave form indicate the voltages or currents which exist for input currents of $$-\frac{I}{2}\text{ units}$$

and —I units, respectively.

Critical examination of the output wave forms shown in FIG. 1 yields some rather startling results. First of all, if the output at terminal 50 is inverted by an inverting amplifier 80 and added to that at terminal 52 by means of coupling resistors 82, and 83, the result is a double V-shaped transfer characteristic at output terminal 85. This transfer characteristic is the same as that of the second encoding stage of the Waldhauer patent. In addition, the output signal at terminal 44 is identical to the digit-output drive signal of the first stage of the Waldhauer patent. Finally, if the output signal at terminal 47 is inverted by an inverting amplifier 90 and added to that at terminal 46 by means of coupling resistors 91, 92, 93, and 94, the result is a trapezoidal wave form at output terminal 95 which is equivalent in its ability to drive the second digit output circuit to the V wave form produced by the second stage of the Waldhauer patent. The threshold of this second digit-output circuit is adjusted to lie slightly below the top of the trapezoid. Thus, an encoding stage embodying the invention, as shown in FIG. 1, performs the functions of two of the coding stages shown in FIG. 6 of the Waldhauer patent. Since the most expensive parts of an encoder are the operational amplifiers, a stage-by-stage encoder embodying this invention results in a substantial cost saving due to the elimination of many of the operational amplifiers.

Figure 2:
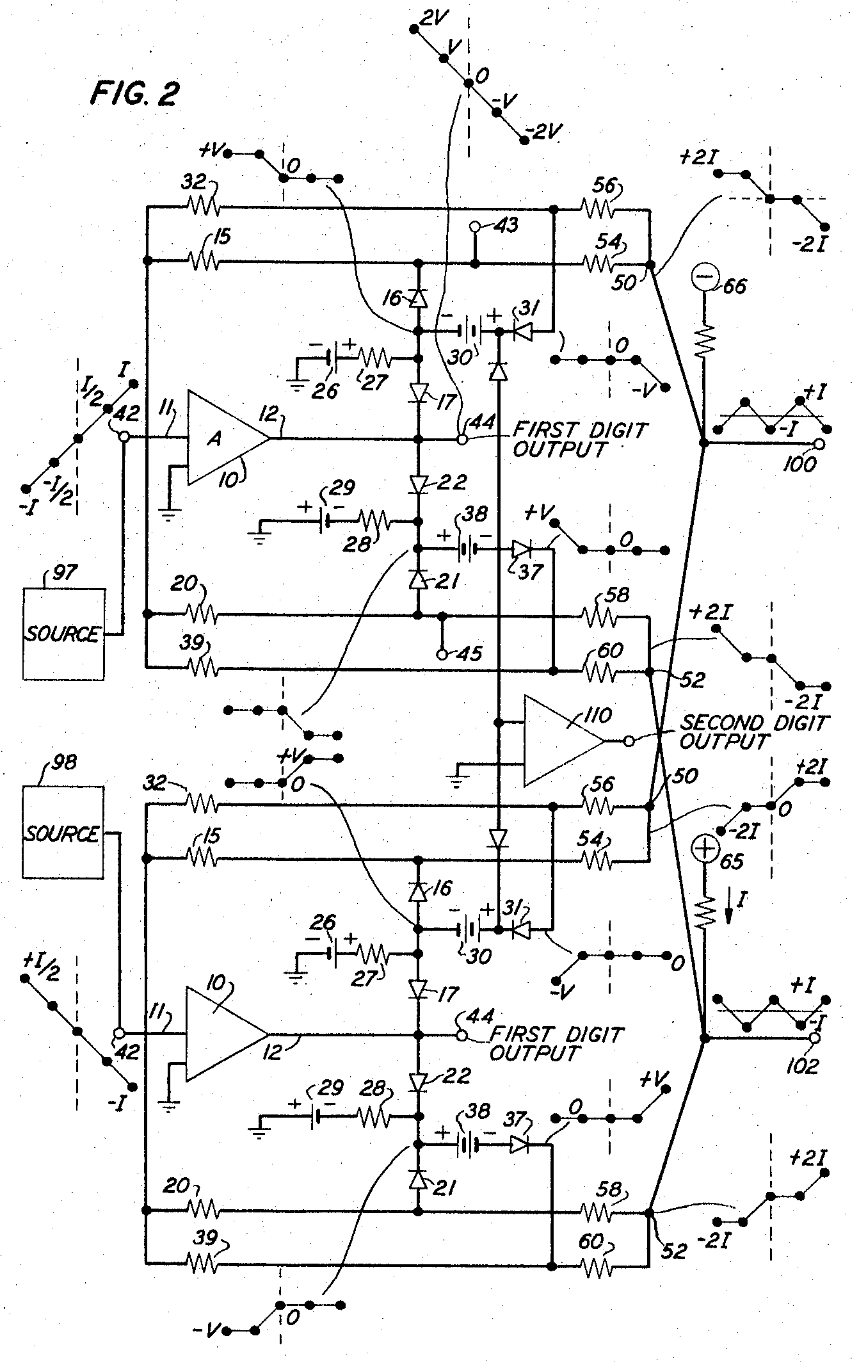
FIG. 2 is a diagram partially in block form of a single stage of a balanced encoder of a type employed in a preferred embodiment of the invention.

While the encoding stage shown in FIG. 1 works satisfactorily, the use of inverter amplifiers reduces the coding speed somewhat. The embodiment of the invention shown in FIG. 2 circumvents these difficulties. As shown in FIG. 2, a "stage" of the balanced encoder is made up of two networks of the type shown in FIG. 1 which operate in phase opposition. That is, when the output of one amplifier is positive, the output of its complementary amplifier in the same stage is negative. In FIG. 2, the first encoding stage of such an encoder is shown and balanced input signals in phase opposition from sources 97 and 98 are applied to each network of the stage. The balanced signals which are applied to the first stage may be derived by means of any one of several well known types of phase inverters. Since the encoding networks are similar to that shown in FIG. 1, like reference numerals have been used to refer to those elements common to the two figures. The output signals at terminals 50 of each stage are summed at an output terminal 100 and since the input signals to the two stages are in phase opposition, the resulting transfer characteristic is a double V-shaped characteristic. Similarly, the output signal at terminals 52 are summed at an output terminal 102 and since the input signals to the stages are in phase opposition, a double V-shaped transfer characteristic is obtained. The signal present at terminal 102 is in phase opposition to that present at terminal 100, and these signals are used to drive subsequent encoding stages in a balanced type encoder without the use of inverters. The first digit output may be obtained at terminal 44 in either stage by means of a threshold circuit and the second digit is obtained by adding signals equal to those at the anodes of diodes 31 in each network at the input of another threshold circuit 110.

Figure 3:
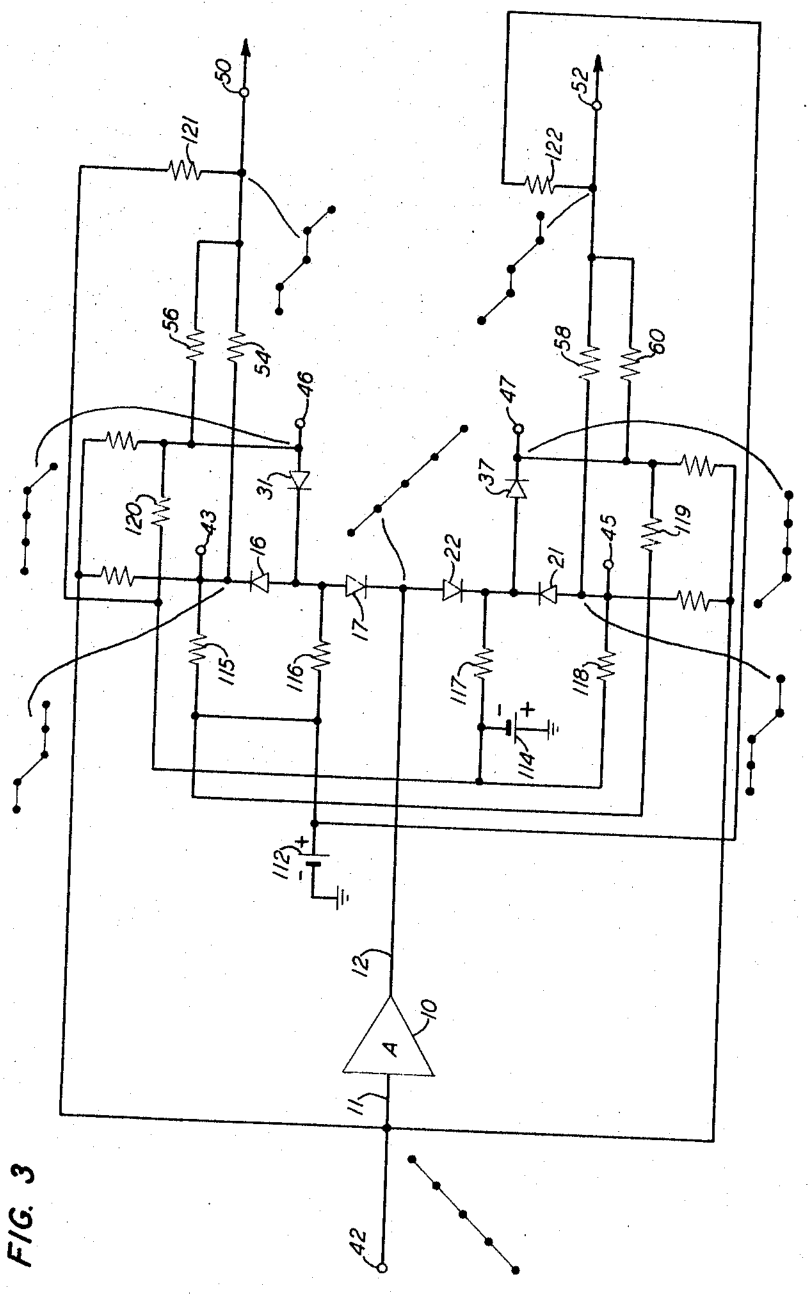
FIG. 3 is a diagram partially in block form of a quaternary encoding circuit embodying the invention and employing more practical biasing networks with fewer batteries than the circuit shown in FIG. 1.

FIG. 3 is a quaternary or four mode encoding stage identical to FIG. 1 except that resistor biasing circuits are employed to eliminate the biasing batteries 26, 29, 30, 38, and 65 and 66 which supply current to summing nodes 50 and 52 through resistors 73 and 75, respectively. This also enables operation with diodes having a rounded knee in their forward characteristic. In place of these batteries two sources of direct current 112 and 114 are used which together with resistors 115, 116, 117, 118, 119, 120, 121, and 122 provide the necessary bias. The stage may be used with inverter amplifiers as shown in FIG. 1, or may be used in a balanced encoder as shown in FIG. 2.

It is to be understood that the above described arrangements are merely illustrative of the application of the principles of the invention. Numerous other arrangements may be devised by those skilled in the art without departing from the spirit and scope of the invention.

What is claimed is:

1. An encoding stage for a stage-by-stage encoder which comprises, in combination, an amplifier having an input terminal and an output terminal, a signal input terminal connected to said amplifier input terminal, a digit output terminal at which a first digit output signal is obtained connected to said amplifier output terminal, two diodes, a first of said diodes having its cathode connected to the output terminal of said amplifier and the second of said diodes having its anode connected to the output terminal of said amplifier, first and second feedback paths connected between said amplifier input terminal and the anode of said first diode, each of said feedback paths comprising the series combination of a diode and a resistance with the diode in the first path poled to conduct current in the opposite direction from the diode in said second path, third and fourth feedback paths each comprising the series combination of a diode and a resistance connected between said amplifier input terminal and the cathode of said diode whose anode is connected to the amplifier output terminal, the diode in said third feedback path being poled to conduct current in the opposite direction from the diode in said fourth feedback path, means for deriving a first analog output signal from the junction of said resistance and said diode of said first feedback path, means for deriving a second analog signal from the junction of said resistance and said diode of said second path, means for deriving a third analog signal from the junction of said resistance and said diode of said third path, means for deriving a fourth analog signal from the junction of said resistance and said diode in said fourth feedback path, means for combining the output signals of said first and third paths, means for combining the output signals of said second and fourth paths, means for combining the combined output signals at a residue output terminal so that the transfer characteristic between the analog input terminal and the residue output terminal is a double V-shaped full wave rectifier transfer characteristic, and means for combining the analog signals from said second and fourth paths to produce a second digit output signal.

2. In a stage-by-stage encoding system wherein a plurality of similar encoding stages are connected in tandem each of said stages having an analog input, an analog output, and first and second digit outputs, improved stage circuitry comprising first, second, third, fourth, and fifth parallel circuit paths connected between said analog input and said first digit output, said first path comprising an amplifier, two diodes, a first of said diodes having its cathode connected to the output terminal of said amplifier and the second of said diodes having its anode connected to the output terminal of said amplifier, said second and third parallel paths being connected between said analog input and the anode of said first diode with each of said first and second paths comprising the series combination of a diode and a resistor with the diodes in said paths being poled to conduct in directions opposite to one another, said fourth and fifth parallel paths being connected between said analog input and the cathode of said second diode of said two diodes connected to said amplifier output and each comprising the series combination of a diode and a resistor with the diodes in said fourth and fifth paths being poled to conduct current in opposite directions with respect to each other, means for obtaining a first sum signal equal to the sum of the signals at the junctions of the resistor and diode of said second and third feedback paths, means for obtaining a second sum signal equal to the sum of the signals at the junction of the resistor and diode of said fourth and fifth paths, means for combining said first and said second sum signals to form a residue output signal, means for applying said residue output signal to said analog output of said stage, means for combining the signals at the junction of said resistors and diodes in said third and fifth paths to produce a second digit output signal at said second digit output terminal, and means connecting said amplifier output terminal to said first digit output terminal.

3. In a stage-by-stage encoder of the balanced type wherein balanced pairs of balanced encoding networks are connected in tandem, each network of each said balanced pair having an analog input, an analog output, and a digit output, first, second, third, fourth, and fifth parallel circuit paths connected between said analog input and said digit output, said first path comprising an amplifier having an input terminal and an output terminal, two diodes, a first of said diodes having its cathode connected to the output terminal of said amplifier and the second of said diodes having its anode connected to the output terminal of said amplifier, said second and third parallel paths being connected between said analog input and the anode of said first diode with each of said first and second paths comprising the series combination of a diode and a resistor with the diodes in said paths being poled to conduct in directions opposite to each other, said fourth and fifth parallel paths being connected between said analog input and the cathode of the second diode of said two diodes connected to said amplifier output and each comprising the series combination of a diode and a resistor with the diodes in said paths being poled to conduct current in opposite directions with respect to each other, a first source of input signals connected to the analog input of a first of said networks, a second source of input signals equal to but in phase opposition to said signals from said first source connected to the analog input of the second network, means for obtaining a first sum signal equal to the sum of the signals at the junctions of the resistor and diode of said second and third feedback paths in each of said networks, means for obtaining a second sum signal equal to the sum of the signals at the junction of the resistor and diode of said fourth and fifth paths in each of said networks, means for combining said first sum signals of said first and said second networks to produce a first residue output signal having a double V-shaped transfer characteristic for application to the next stage, means for combining the second sum signals from each network to produce a residue output signal having a double V-shaped transfer characteristic for application to the next stage, and means for adding the signals at the anode of said first diodes connected to the amplifier output in said networks to produce a second digit output signal.

References Cited

UNITED STATES PATENTS

| | | | |
|---|---|---|---|
| 3,161,868 | 12/1964 | Waldhauer | 340—347 |
| 3,329,950 | 7/1967 | Shafer | 340—347 |

MAYNARD R. WILBUR, *Primary Examiner.*

CHARLES D. MILLER, *Assistant Examiner.*

U.S. Cl. X.R.

179—15